United States Patent [19]
Beizerov

[11] 3,723,632
[45] Mar. 27, 1973

[54] WATER COOLING SYSTEM FOR VACUUM ARC FURNACE

[76] Inventor: Semen Moiseevich Beizerov, ulitsa Bolshaya Akademicheskaya, 73, Korpus 2, kv. 72, Moscow, U.S.S.R.

[22] Filed: Mar. 9, 1972

[21] Appl. No.: 233,145

[30] Foreign Application Priority Data

Mar. 17, 1971 U.S.S.R. .............................. 1628322

[52] U.S. Cl. ........................... 13/32, 263/44, 266/32
[51] Int. Cl. ............................. H05b 7/02, F27d 9/00
[58] Field of Search ........ 13/1, 9, 32; 263/44; 266/32

[56] References Cited

UNITED STATES PATENTS

| | | | |
|---|---|---|---|
| 3,202,751 | 8/1965 | Wooding | 13/32 |
| 3,429,973 | 2/1969 | Carter et al. | 13/32 |

*Primary Examiner*—Roy N. Envall, Jr.
*Attorney*—John C. Holman et al.

[57] ABSTRACT

The cooling system is connected with a main for continuous cooling water supply coupled to an electrode holder cooling pipeline.

After cooling the electrode holder, water is fed into the cooling spaces of a mould and of a bottom plate.

The cooling system is provided with a reserve vessel which is connected by pipelines with the cooling spaces of the electrode chamber, mould and bottom plate of the furnace.

2 Claims, 1 Drawing Figure

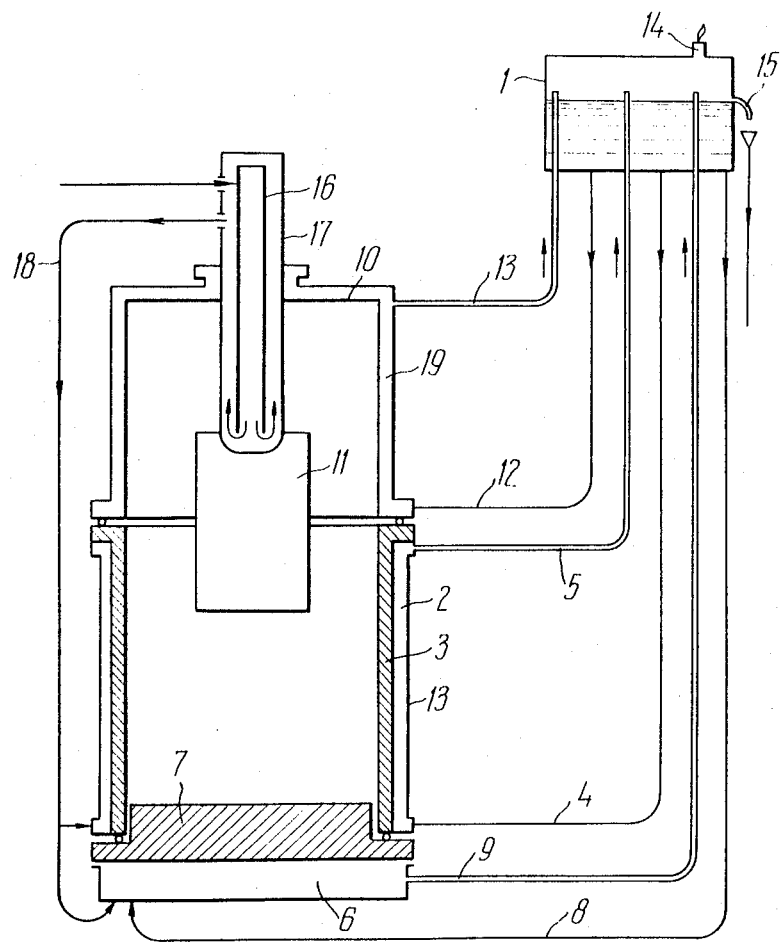

WATER COOLING SYSTEM FOR VACUUM ARC FURNACE

The present invention relates to metallurgy and more particularly to water cooling systems for melting units.

The system of the present invention may prove to be most advantageous for cooling vacuum arc furnaces wherein different portions are subject to thermal loads of different magnitudes.

The present system may find particular application in the production of highly reactive and special metals or alloys with the use of vacuum arc furnace remelting techniques.

Known in the art are water supply systems for vacuum arc furnaces comprising an electrode chamber, an electrode holder, a mould and a bottom plate, these systems operating in accordance with a principle of individual water supply, cooling water fed from a continuous supply main under a pressure of up to 5 atm being individually pumped through each portion of the unit to be cooled and then drained into a cooling tower or a spray pond. In such systems the rate of flow of the water being pumped should be sufficiently high so that water boiling or at least film boiling could be precluded. The latter condition can be met only by a high flow rate of cooling water, which in modern vacuum arc furnaces reaches 100 m$^3$/hr per furnace and over. But even with such high flow rates, units subject to maximum thermal stresses, e.g., moulds, become covered with hard scale which materially deteriorates heat exchange conditions. The use of chemically purified or distilled water for furnace cooling is associated with the necessity of additional equipment. Elevated water pressure in the supply system creates additional loads on the furnace walls.

In the course of remelting, for example of titanium or titanium alloys, the mould wall or the bottom plate may melt through due to instability of the arc discharge. In such a case water gets into the melting zone and decomposes into oxygen and hydrogen; this oxygen is absorbed by molten titanium, and air which gets into the furnace forms detonating gas with the hydrogen, leading to an explosion. The now-existing water cooling systems thus fail to ensure safe and reliable operation conditions of furnaces.

Water cooling systems are also known, which comprise a reserve vessel connected by a system of pipelines with the cooling spaces of the melting unit and with the constant cooling water supply main.

Such systems operate on the evaporative cooling principle and are widely used in ferrous metallurgy in open-hearth, blast and heating furnaces.

These systems are made as a plurality of individual cooling loops with natural circulation of boiling water therein. All these loops are parallel-connected by pipelines to a reserve vessel, installed at a definite height which is selected in accordance with the hydraulic resistance of the connection pipelines and configuration of the cooling spaces, as well as their arrangement and the number of water exchange cycles. A characteristic feature of all such furnaces is that thermal loads arising when they are cooled do not exceed the critical value. Cooling systems employed in these furnaces operate on chemically purified water. Since during the evaporation part of the water is lost as steam, the system is provided with a water feed into the reserve vessel from an external source.

The water level in the reserve vessel is maintained constant with the help of a level control device.

The last-mentioned systems, however, are disadvantageous in view of chemically purified water being required for their operation and due to their complexity.

It is an object of the present invention to simplify the water cooling system for vacuum arc furnaces as a whole and reduce the number of control and measuring instruments therein. Said object is accomplished by the provision of a water cooling system, wherein a constant cooling water supply main is connected with a cooling space of an electride holder, said cooling space being connected by pipelines with cooling spaces of a mould and a bottom plate, the cooling system being provided with a reserve vessel arranged not lower than the top mark of a furnace to be cooled and connected by pipelines with the cooling spaces of the mould, bottom plate and electrode chamber.

Such a circuit for connecting the pipelines in the cooling system has been chosed with a view to diminishing the consumption of the cooling water.

Another object of the invention is to increase the reliability and safety of the system operation.

In vacuum arc furnaces the mould and the bottom plate are subject to maximum thermal stresses, whereas the electrode holder and the electrode chamber operate under relatively lower thermal stresses.

The present water cooling system functions in an evaporative cooling mode with natural circulation of boiling water, the water from a supply main being fed for cooling the electrode holder and thence into the cooling spaces of the mould and the bottom plate.

Such an engineering solution allows a 8 to 10-fold reduction in the flow rate (consumption) of the cooling water, with a considerable enhancement of the operation reliability and explosion proofness of the system.

In the present system the reserve vessel is provided with a water overflow pipe. The water in the reserve vessel is always level with the overflow pipe. Guaranteed reserve of water in this vessel makes it possible to use it in emergency cases as a hydraulic seal.

Given hereinbelow is a detailed description of the present water cooling system for vacuum arc furnaces, with reference to the accompanying drawing in which said system for a furnace of the type described is represented diagrammatically.

Vacuum arc furnaces are employed for remelting highly reactive metals and alloys. Melting and crystallization of ingots in such furnaces are conducted in a vacuum of from $1.10^{-1}$ to $1.10^{-2}$ mm Hg. The metal being remelted serves as an electrode. Investigations of thermal loads to which vacuum arc furnaces are subject have shown these loads to exceed critical ones on the bottom plate and the mould, but to be insignificant on the electrode chamber and the electrode holder.

The water cooling system of the present invention includes a reserve vessel 1 which is installed, in our case, level with the top mark of the furnace. The height at which the vessel 1 is to be installed is so selected as to ensure free exit of the steam-water mixture from the uppermost point of the cooling space of the electrode chamber. The capacity of the reserve vessel 1 is selected to be adequate to the furnace power and to the duration of the melting cycle, so that said cycle could be run without additional feeding of the cooling system with water. The vessel 1 is connected with the cooling spaces of each unit of the furnace by means of charge and discharge pipelines: the vessel 1 communicates with cooling space 2 of mould 3 via a charge pipe 4 and a discharge pipe 5; with cooling space 6 of a bottom plate 7, via a charge pipe 8 and a discharge pipe 9; and with chamber 10 of an electrode 11, via pipes 12 and 13, respectively.

The inlet openings of the charge pipes 4, 8 and 12 are located in the bottom of the vessel 1, and the outlet openings of the discharge pipes 5, 9 and 13 are located above the water level in the vessel 1. In the upper portion of the vessel 1 a pipe 14 is provided for letting steam out into the atmosphere or directing it to a heat consumer. The level of water in the vessel 1 is adjusted with the help of an overflow pipe 15. The water overflown from the vessel 1 leaves the system and gets into a main leading to an external source of cooling water (not shown in the drawing).

The gap between the furnace walls and jackets which enclose the furnace units and define the cooling spaces is selected such as to ensure free exit of the steam-water mixture that forms in said spaces into the reserve vessel 1.

From the supply main cooling water is delivered to a pipe 16 for cooling an electrode holder 17. On leaving the electrode holder 17, water goes along a pipeline 18 which is in communication with the lower portion of the cooling space of the mould 3 and with the cooling space 6 of the bottom plate 7.

The present water cooling system operates as follows.

In the vacuum arc furnace the metal being remelted serves as the electrode 11. When the electrode 11 and the bottom plate 7 are connected to the terminals of a current source (not shown), an electric arc strikes between the electrode and the bottom plate. The metal being remelted flows onto the bottom plate 7 and is shaped into an ingot in the mould 3.

In the process of melting, radiant heat and the heat from the ingot being crystallized is transferred through the walls of the mould 3 and the bottom plate 7 to the cooling water which is heated thereby to its boiling point.

The resulting steam-water mixture goes along the pipes 5, 9 and 13, reaching the vessel 1, wherein steam is separated and is let out into the atmosphere, while water, via the pipes 4, 8 and 12, is returned into the cooling spaces 2 and 6 of the mould 3 and the bottom plate 7.

The chamber 10 of the electrode 11, which receives heat from the melting electrode 11 and from the bath of liquid metal in the mould 3, is cooled in a similar manner.

In the cooling loops of the chamber 10 of the electrode 11, of the mould 3 and of the bottom plate 7 boiling conditions are those of free convection with natural circulation. Heat removal is taking place, mainly, due to vaporization.

Upon cooling the electrode holder 17, water comes to the cooling spaces 6 and 2 of the bottom plate 7 and the mould 3 along the pipeline 18. This makes up for the water lost as steam which escapes from the reserve vessel 1 into the atmosphere or is directed to heat consumers. Excess water is drained through the pipe 15 into the main.

Thus the overall consumption of water per furnace is equal to the amount of water required for cooling the electrode holder 17 and is 8 to 10 times as less as that required by conventional vacuum arc furnaces.

In case of emergency cut off of water supply into the pipeline 16 for cooling the electrode holder 17, normal cooling of the mould 3, bottom plate 7 and chamber 10 of the electrode 11 is not disturbed.

Operation of a pilot vacuum arc furnace equipped with the present water cooling system has shown that though the cooling system is fed with technical water, no scale is formed on the furnace walls.

Cooling of the mould 3 by water boiling under free convection conditions rules out the necessity of strict centering thereof in the jacket.

Insofar as the cooling system communicates through the pipe 14 of the vessel 1 with the atmosphere, the pressure in the cooling spaces of the furnace is close to atmospheric, whereby mechanical loads on the furnace walls are considerably diminished.

In case the wall of the mould 3 or of the bottom plate 7 happens to be melted through by the arc, e.g., when melting titanium or its alloys, explosion hazards are much smaller, since air practically has no access into the furnace as long as the reserve vessel 1 is filled with water, the vessel 1 thus functioning as a hydraulic seal.

Moreover, water contained in the vessel 1, in the pipes 4, 8 and 12, and in the cooling spaces 2, 6 and 19 of the furnace retains a temperature of about 100°C and continues circulating with the system, heating the furnace walls in the interim between melts. This provides for better conditions of furnace evacuation before starting a successive melt.

We claim:

1. A water cooling system for a vacuum arc furnace comprising: a bottom plate provided with a cooling space therefor, a mould mounted on said bottom plate and enclosed by a jacket defining a cooling space thereof, an electrode chamber arranged on said mould and having a cooling space, an electrode holder fastened in the upper portion of said electrode chamber; a pipeline running from said electrode holder, said pipeline for cooling said electrode holder and communicating with said cooling spaces of the said mould and bottom plate; a main for continuous cooling water supply communicating with said pipeline; a reserve vessel for cooling water whose bottom portion is located at least level with the top mark of said furnace; and a system of pipelines connecting said reserve vessel with said cooling spaces of the said mould, bottom plate and electrode chamber.

2. A water cooling system for a vacuum arc furnace as claimed in claim 1, wherein the reserve vessel is provided with a pipe for maintaining the water in said vessel with said pipe.

* * * * *